United States Patent
Willauer et al.

(10) Patent No.: US 8,313,557 B2
(45) Date of Patent: Nov. 20, 2012

(54) RECOVERY OF [CO$_2$]$_T$ FROM SEAWATER/AQUEOUS BICARBONATE SYSTEMS USING A MULTI-LAYER GAS PERMEABLE MEMBRANE

(75) Inventors: Heather D. Willauer, Fairfax Station, VA (US); Dennis R Hardy, California, MD (US); M. Kathleen Lewis, Lake Ariel, PA (US); Ejiogu C. Ndubizu, Burtonsville, MD (US); Frederick Williams, Accokeek, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 369 days.

(21) Appl. No.: 12/491,460

(22) Filed: Jun. 25, 2009

(65) Prior Publication Data
US 2010/0028242 A1    Feb. 4, 2010

Related U.S. Application Data

(60) Provisional application No. 61/084,700, filed on Jul. 30, 2008.

(51) Int. Cl.
*B01D 53/22* (2006.01)
*C01B 31/20* (2006.01)
(52) U.S. Cl. ............ 95/51; 95/46; 96/4; 96/6; 96/11; 96/12
(58) Field of Classification Search .......... 95/46, 51; 96/4, 6, 11, 12; 210/639, 640, 500.27; 423/437.1
See application file for complete search history.

(56) References Cited

U.S. PATENT DOCUMENTS

| | | | |
|---|---|---|---|
| 5,643,799 A * | 7/1997 | Atwater et al. | 436/133 |
| 5,876,486 A * | 3/1999 | Steinwandel et al. | 95/51 |
| 6,712,342 B2 | 3/2004 | Bosko et al. | |
| 7,591,878 B2 * | 9/2009 | Feron et al. | 95/51 |
| 7,713,332 B2 * | 5/2010 | Bronold | 95/51 |
| 7,771,599 B1 * | 8/2010 | Choi et al. | 95/51 |
| 8,043,411 B2 * | 10/2011 | Federspiel et al. | 95/46 |
| 2005/0232833 A1 * | 10/2005 | Hardy et al. | 422/188 |
| 2008/0289396 A1 * | 11/2008 | Johnson et al. | 96/6 |
| 2010/0240141 A1 * | 9/2010 | Nakano | 436/163 |
| 2011/0132840 A1 * | 6/2011 | Choi et al. | 210/638 |

OTHER PUBLICATIONS

Bhaumik et al., "Hollow Fiber Membrane Degassing in Ultrapure Water and Microbiocontamination," *J. Membr. Sci.*, 235, 31 (2004).
Bhave et al., "Gas Permeation and Separation by Aqueous Membranes Immobilized Across the Whole Thickness or in a Thin Section of Hydrophobic Microporous Celgard Films," *J. Membr. Sci.*, 27, 41 (1986).

(Continued)

*Primary Examiner* — Jason M Greene
(74) *Attorney, Agent, or Firm* — Amy Ressing; Rebecca Forman (57) ABSTRACT

The present invention is generally directed to a system for recovering CO$_2$ from seawater or aqueous bicarbonate solutions using a gas permeable membrane with multiple layers. At elevated pressures, gaseous CO$_2$ and bound CO$_2$ in the ionic form of bicarbonate and carbonate diffuse from the seawater or bicarbonate solution through the multiple layers of the membrane. Also disclosed is the related method of recovering CO$_2$ from seawater or aqueous bicarbonate solutions.

12 Claims, 3 Drawing Sheets

OTHER PUBLICATIONS

Chen et al., "Immobilized Glycerol-Based Liquid Membranes in Hollow Fibers for Selective Cos-N2 mixtures," *J. Membr. Sci.*, 183, 75 (2001).

Coffey et al., "Hydrogen as a Fuel for DOD," *Defense Horizons*, 36, 1 (2003).

Eash et al., "Evaluation of Plasma Resistant Hollow Fiber Membranes for Artificial Lungs," *ASAIO J.*, 50, 491 (2004).

Edmond, "High Precision Determination of Titration Alkalinity and Total Carbon Dioxide Content of Sea Water by Potentiometric Titration," *Deep-Sea Res.*, 17,737 (1970).

Gabelman et al., "Hollow Fiber Membrane Contactors," *J. Membr. Sci.*, 159, 61 (1999).

Glade et al., "Modeling of CO2 release and the carbonate system in multiple-effect distillers," *Desalination*, 222, 605 (2008).

Hardy et al., Extraction of Carbon Dioxide from Seawater by Ion Exchange Resin Part I: Using a Strong Acid Cation Exchange Resin, Memorandum Report 6180-07-9044, Naval Research Laboratory, Washington DC, Apr. 20, 2007.

Johnson et al., "$TCO_2$ Analyses for Marine Studies: An Introduction," *Marine Chem.*, 16, 61 (1985).

Kovvali et al., "Carbon Dioxide Separation with Novel Solvents as Liquid Membranes," *Ind. Eng. Chem. Res.*, 41, 2287 (2002).

Lund et al., "Gas Permeability of Hollow Fiber Membranes in a Gas-Liquid System," *J. Membr. Sci.*, 117, 207 (1996).

Lund et al., "Gas Permeance Measurement of Hollow Fiber Membranes in Gas-Liquid Environment," *AIChE J.*, 48, 635 (2002).

Matson st al., "Review Article No. 13: Separation of Gases with Synthetic Membranes," *Chem. Eng. Sci.*, 38, 503 (1983).

Millero et al., "Titration Alkalinity of Seawater," *Marine Chem.*, 44, 153 (1993).

Mohanasundaram, "Renewable Power Generation-Utilising Thermal Energy from Oceans," *Enviro. Sci. Eng.*, 4, 35 (2007).

Roman et al., "A Simple Experiment for Measuring the Surface Tension of Soap Solutions," *Am. J. Phys.*, 69, 920 (2001).

Stumm et al., Aquatic Chemistry: An introduction emphasizing chemical equilibirum in natural waters, Wiley-Interscience, New York (1970).

Takahashi et al., "Carbonate chemistry of the surface waters of the world oceans," Isotope Marine Chemistry, Uchida Rokakuko, Tokyo, pp. 291-326 (1980).

Takahashi et al., "The alkalinity and total carbon dioxide concentration in the world ocean." Carbon cycle modeling, John Wiley and Sons, New-York, pp. 271-286 (1981).

Ward et al., "Carbon Dioxide-Oxygen Separation: Facilitated Transport of Carbon Dioxide across a Liquid Film," *Science*, 156, 1481 (1967).

Wiesler et al., "Deaeration: Degasification of Water Using Novel Membrane Technology," Ultrapure Water, UP130653, 53-56 (1996).

Willauer et al., "Recovery of $CO_2$ from Aqueous Bicarbonate Using a Gas Permeable Membrane," *Energy & Fuels*, 23, 1770-1774 (2009).

Willauer et al., "Recovery of $[CO_2]T$ from Aqueous Bicarbonate Using a Gas Permeable Membrane," NRL Memorandum Report 6180-08-9129, Naval Research Laboratory, Washington DC, Jun. 25, 2008.

Wilson, "A Renaissance for Hofmeister," *C&EN*, 85, 47 (2007).

Yang et al., "Progress in Carbon Dioxide Separation and Capture: A Review," *J. Environ. Sciences.*, 20, 14 (2008).

Yasuda et al., "Transfer of Gas to Dissolved Oxygen in Water Via Porous and Nonporous Polymer Membranes," *J. Appl. Polym. Sci.*, 16, 595 (1972).

* cited by examiner

RECOVERY OF [CO₂]ᴛ FROM SEAWATER/AQUEOUS BICARBONATE SYSTEMS USING A MULTI-LAYER GAS PERMEABLE MEMBRANE

PRIORITY CLAIM

This Application claims priority from U.S. Provisional Application No. 61/084,700 filed on Jul. 30, 2008 by Nick E. Tran et al., entitled "HIGH PRESSURE MEMBRANE EXTRACTION OF CO₂ FROM SEAWATER," the entire contents of which are incorporated herein by reference.

BACKGROUND OF THE INVENTION

1. Field of the Invention

The present invention relates generally to $CO_2$ extraction and, more specifically, to recovery of $CO_2$ from seawater and/or aqueous bicarbonate systems using a multi-layer gas permeable membrane.

2. Description of the Prior Art

There is interest in producing synthetic fuel from renewable sources on sea-based vessels to avoid the risks in procuring fuel from foreign sources and/or in maintaining long supply lines. The procurement and transportation risk can be reduced by producing synthetic fuel from hydrogen and carbon generated near the point of fuel use. Although there are current technologies to synthesize hydrocarbon fuel on land given sufficient primary energy resources such as coal, these technologies are not practical for sea-based generation.

The ocean is a possible resource for carbon dioxide. The total carbon content of the world's oceans is roughly 38,000 GtC (gigaton of carbon). Over 95% of this carbon is in the form of dissolved bicarbonate ion ($HCO_3^-$). This ion along with carbonate is responsible for buffering and maintaining the ocean's pH, which is relatively constant below the first 100 meters. In addition, the bicarbonate/carbonate system maintains the pH of the ocean below 100 m. This dissolved bicarbonate and carbonate is essentially bound $CO_2$, and as shown in equation (1), the sum of these species along with gaseous $CO_2$ represents the total carbon dioxide concentration $[CO_2]_T$ of seawater.

$$[CO_2]_T = [CO_2(g)] + [HCO_3^-] + [CO_3^{2-}] \quad (1)$$

At a typical ocean pH of 7.8, $[CO_2]_T$ is about 2000 μmoles/kg near the surface and 2400 μmoles at depths below 300 meters. (Takahasi et al., "The Alkalinity and Total Carbon Dioxide Concentration in the World Oceans," *Carbon Cycle Modeling*, John Wiley and Sons, New-York, 271-286 (1981); Takahasi et al., "Carbonate Chemistry of the Surface of the Waters of the World Oceans," *Isotope Marine Chemistry*, Uchida Rokakuho, Tokyo, Japan, 291-326 (1980), the entire contents of each are incorporated herein by reference.) This equates to approximately 100 mg/L of $[CO_2]_T$ of which 2 to 3% is $CO_2$ (g), 1% is carbonate, and the remainder is dissolved bicarbonate.

In the atmosphere, the concentration of $[CO_2]_T$ approximately is 370 ppm (v/v), which is 0.7 mg/L (w/v) or 780 GtC. Comparing this value on a w/v basis, it is apparent that $CO_2$ in seawater is about 140 times greater than air. (Coffey et al., "Hydrogen as a Fuel for DOD," *Defense Horizons*, 36, 1 (2003), the entire contents of which is incorporated herein by reference.) Thus if carbon dioxide could be economically and efficiently extracted from the ocean, then marine engineering processes such as OTEC (ocean thermal energy conversion) (Mohanasundaram, "Renewable Power Generation-Utilising Thermal Energy from Oceans," *Enviro. Sci. Eng.*, 4, 35 (2007), the entire contents of which is incorporated herein by reference) could be proposed to utilize this carbon as a chemical feedstock in processes such as catalytic polymerization with hydrogen.

Seawater is a very complex buffered system that is in equilibrium with the atmosphere above it. Thus under equilibrium conditions, the dissolved $[CO_2(g)]$ in equation (1) is actually hydrated with one mole of water in the form known as carbonic acid as shown in equation (2). The dissolved bicarbonate and carbonate are in equilibrium with this dissolved carbonic acid species as shown in equation (3).

The carbonic acid species is in equilibrium with the gas phase above the water as carbon dioxide, and so any reduction of carbon dioxide partial pressure in the gas phase will cause the equilibria of the entire system to shift to the left (equation (3)). (Werner et al., *Aquatic Chemistry: An introduction emphasizing chemical equilibrium in natural waters*; Wiley-Interscience: New York (1970); Glade et al., "Modeling of $CO_2$ release and the carbonate system in multiple-effect distillers," *Desalination*, 222, 605 (2008), the entire contents of each are incorporated herein by reference.) Kinetically, this is a very slow and not well understood process. (Wilson, "A Renaissance for Hofmeister," *C&EN*, 85, 47 (2007), the entire contents of which are incorporated herein by reference.) For example, it would take about 2.8 hours to completely remove all the carbonate species in the form of $CO_2$ gas in one liter of seawater by applying a vacuum of 15 mm of Hg to the seawater spread in a thin film (such as in a rotary evaporator). (Werner et al., *Aquatic Chemistry: An introduction emphasizing chemical equilibrium in natural waters*; Wiley-Interscience: New York (1970).) Even a bulk process such as vacuum degassing of carbon dioxide gas would yield only about 0.1 kg/sec of carbon dioxide. From an ocean engineering perspective, the rate of carbon recovery by vacuum extraction or vacuum degassing of the 2 to 3% of the dissolved $CO_2$ would be entirely too slow to obtain useful amounts of carbon on the order of 10 kg/sec.

In addition to the complex equilibrium buffer system affecting $CO_2$ recovery from seawater, there is a potential for the excessive salinity of seawater to interfere with developing fast and efficient approaches to $CO_2$ capture. The salinity is on the order of 35 g/L and is attributed primarily to sodium chloride. The chloride content is approximately 240 times more concentrated than that of bicarbonate. In efforts to overcome these challenges, the use of simple ion exchange resin systems as direct and indirect methods of $CO_2$ recovery from seawater has been investigated. (Hardy et al., *Extraction of Carbon Dioxide from Seawater by Ion Exchange Resin Part I: Using a Strong Acid Cation Exchange Resin*, Memorandum Report 6180-07-9044, Naval Research Laboratory: Washington D.C., Apr. 20, 2007, the entire contents of which are incorporated herein by reference.) Strong base anion exchange resins' selectivity and capacity was proven inefficient to acquire the 10 kg/sec of carbon needed for a catalytic process. Strong acid cation exchange resins were successful at acidifying seawater to a pH less than 6 so the total $CO_2$ existed in the dissolved gas form. (Johnson et al., "Coulometric $TCO_2$ Analyses for Marine Studies: An Introduction," *Marine Chem.*, 16, 61 (1985), the entire contents of which are incorporated herein by reference.) However, that approach was deemed impractical from a regeneration perspective.

Gas permeable membranes are available commercially for the removal or addition of gases to liquids. Most of these applications are near atmospheric pressure and include water purification, blood oxygenation and artificial lung devices. (Bhaumik et al., "Hollow Fiber Membrane Degassing in Ultrapure Water and Microbiocontamination," *J. Membr. Sci*, 235, 31 (2004); Lund et al., "Gas Permeance Measurement of Hollow Fiber Membranes in Gas-Liquid Environment," *AIChE J.*, 48, 635 (2002); Lund et al., "Gas Permeability of Hollow Fiber Membranes in a Gas-Liquid System," *J. Membr. Sci*, 117, 207 (1996); and Eash et al., "Evaluation of Plasma Resistant Hollow Fiber Membranes for Artificial Lungs," *ASAIO J.*, 50, 491 (2004), the entire contents of each are incorporated herein by reference.) However, some are operated at higher pressures such as beverage carbonation. (Bosko, "Hollow Fiber Carbonation," U.S. Pat. No. 6,712,342, Mar. 20, 2004; Gabelman et al., "Hollow Fiber Membrane Contactors," *J. Membr. Sci*, 159, 61 (1999), the entire contents of each are incorporated herein by reference.) It is well known that these membranes work on the principle of dissolved gases such as carbon dioxide diffusing across the membrane through the pores as a function of differential partial gas pressures. Therefore, it has been assumed for gas/liquid systems that only the dissolved carbon dioxide gas is removed while the bound carbon dioxide in the ionic form of bicarbonate and carbonate is not involved. (Wiesler et al., "Deaeration: Degasification of Water using Novel Membrane Technology," *Ultrapure Water*, UP130653, 53-56 (1996), the entire contents of which are incorporated herein by reference.) The rate and yield of carbon dioxide for a given separation is dependent on several parameters which include the degasification matrix, membrane material and geometry, temperature, and pressure. (Matson et al., "Review Article Number 13: Separation of Gases with Synthetic Membranes," *Chem. Eng. Sci.*, 38, 503 (1983), the entire contents of which is incorporated herein by reference.)

BRIEF SUMMARY OF THE INVENTION

The aforementioned problems are overcome in the present invention which provides a system for recovering $CO_2$ from seawater and/or aqueous bicarbonate solutions using a gas permeable membrane with multiple layers. At elevated pressures, gaseous $CO_2$ and bound $CO_2$ in the ionic form of bicarbonate and carbonate diffuse from the seawater through the multiple layers of the membrane. Also disclosed is the related method of recovering $CO_2$ from seawater or aqueous bicarbonate systems.

$CO_2$, in the ionic form of bicarbonate, undergoes a phase transition as it disproportionates to carbon dioxide and carbonate. This happens when gaseous carbon dioxide is removed from water by diffusion through multiple gas permeable membrane layers at elevated bulk water pressures ($\geq 100$ psi). The multiple layers can be used to minimize water permeability especially at pressures near or above the bubble point of a single layer membrane.

These and other features and advantages of the invention, as well as the invention itself, will become better understood by reference to the following detailed description, appended claims, and accompanying drawings.

BRIEF DESCRIPTION OF THE DRAWINGS

FIG. 2 is a schematic diagram of a gas permeable membrane process for a bicarbonate system. The equations are placed either to the left or right (or directly over the membrane) to show the loss of $CO_2$ from the bulk liquid (on the left of the membrane) into air (on the right of the membrane). The actual effects of the $CO_2$ loss on the species remaining in the bulk liquid are shown. Initially, bicarbonate accepts a proton in water to form undissociated carbonic acid (equation (a)). The decomposition of $H_2CO_3$ at the membrane surface to $CO_2$ causes an increase in pH (loss in acidic species) as shown in equation (b). To compensate for an increase in pH, the remaining $H_2CO_3$ dissociates to bicarbonate and hydronium ion (equation (c)). The bicarbonate ion that is formed disproportionates to carbonate, and $CO_2$ is lost through the membrane (equation (d)). The ratio of carbonate to bicarbonate limits pH change in the solution. The initial process is (a) to (b). As this occurs the process of (a) to (c) begins to occur followed by the process (c) to (d).

FIG. 3 is a schematic diagram of a gas permeable membrane process for seawater. The equations are placed either to the left or right (or directly over the membrane) to show the loss of $CO_2$ from the bulk liquid (on the left of the membrane) into air (on the right of the membrane). The actual effects of the $CO_2$ loss on the species remaining in the bulk liquid are shown. Initially, the [$CO_2(g)$] is hydrated by water to form undissociated carbonic acid (equation (a)). The decomposition of $H_2CO_3$ at the membrane surface to $CO_2$ causes an increase in pH (loss in acidic species) as shown in equation (b). To compensate for an increase in pH, the bicarbonate begins to dissociate contributing a proton and a carbonate ion (equation (c)). The bicarbonate ions that were once in equilibrium, as shown in equation (a), also begin to disproportionate to carbonate, and $CO_2$ is lost through the membrane (equation (d)). The ratio of carbonate to bicarbonate limits pH change in the solution. The initial process is (a) to (b). As this occurs the process of (a) to (c) begins to occur followed by the process (a) to (d).

DETAILED DESCRIPTION OF THE INVENTION

The present invention generally relates to using a gas permeable membrane to recover $CO_2$ from seawater and/or aqueous bicarbonate solutions. $CO_2$, in the ionic form of bicarbonate, undergoes a phase transition as it disproportionates to carbon dioxide and carbonate when gaseous carbon dioxide is removed from water by diffusion through multiple gas permeable membrane layers at elevated bulk water pressures ($\geq 100$ psi). The pressure is elevated because the equilibrium of the buffer anions is an opposing force that limits the amount of $CO_2$ released. Multiple layers can be used to minimize water permeability at pressures near or above the bubble point of a single layer membrane. The bubble point pressure by the Young-Laplace equation for the membranes used in experimentation is approximately 500 psi and is defined in equation (4) where P is the pressure, γ is the surface tension of the liquid in dynes/cm, and D is the effective diameter of the membrane pore in μm. (Roman et al., "A Simple Experiment for Measuring the Surface Tension of Soap Solutions, *Am. J. Phys.*, 69, 920 (2001), the entire contents of which are incorporated herein by reference.)

$$P=4\gamma/D \qquad (4)$$

Experimental—Aqueous Bicarbonate

Because of the potential to operate gas permeable membranes underwater for recovery of carbon, experiments were performed at pressures normally seen at about 300 meters (500 psi or 4 Mpa). Furthermore, a model system was used for initial results. The model consisted of either deionized or typical potable fresh water of known carbon dioxide content. The carbon content of the water was increased by the addition of sodium bicarbonate to concentrations about five times those seen in typical seawater. This was done to enhance the measurable loss in bound $CO_2$ in the ionic form of bicarbonate and carbonate.

Figure 1:
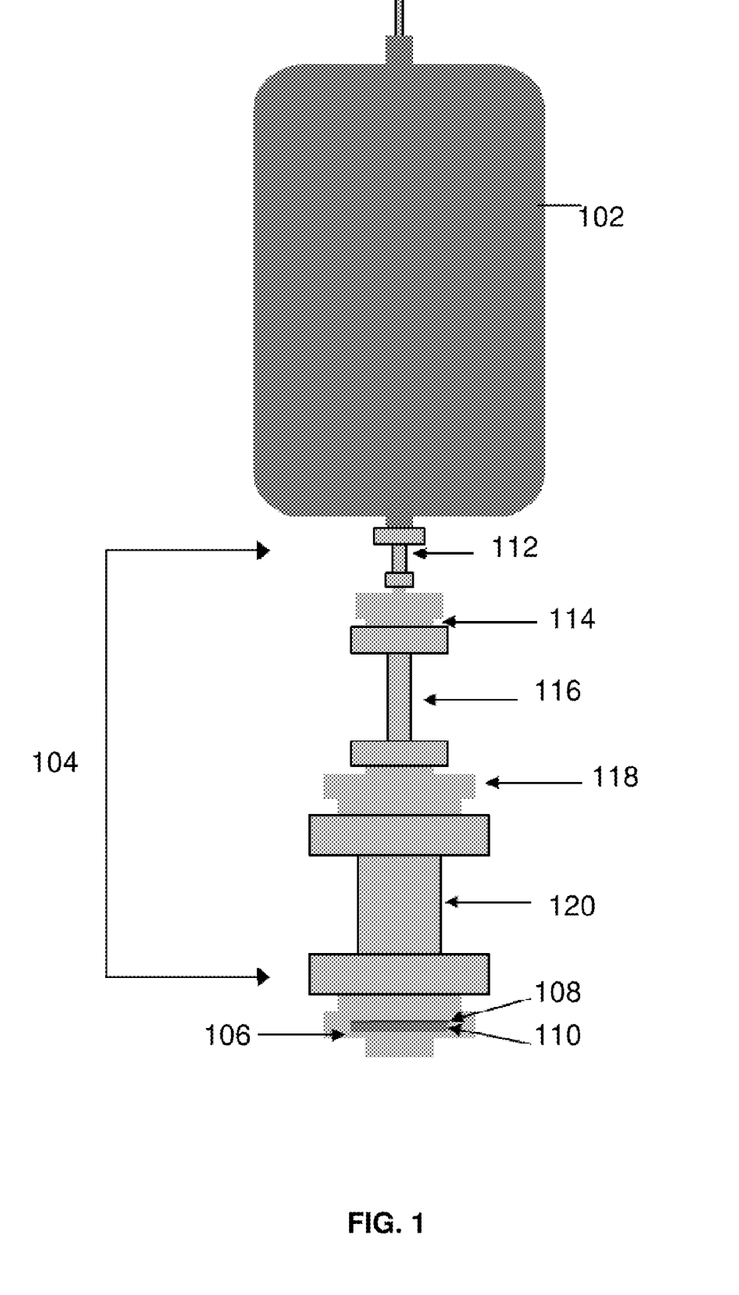
FIG. 1 shows a depiction of a membrane extractor.

Reagent grade sodium bicarbonate was added to deionized water at a concentration of 1 gram per liter with the total $CO_2$ concentration approximately 12700 μmoles/kg by coulometry. This concentration is about 5 times higher than seawater, which this model system is meant to simulate. The reason for using higher salt concentrations is to compensate for the small experimental sample sizes used in the pressure experiments and the even smaller aliquots of the post experimental sample sizes that are required for the coulometric titrations. The pH of the water bicarbonate solution measured 8.56, and all pH measurements were conducted with a standardized Fisher combination glass electrode. A microporous polypropylene membrane commercially designated as 2400 Microporous Membrane with a 37% porosity, 0.117×0.042 μm rectangular pore dimensions (with effective pore area of 0.005 $\eta m^2$ which is equivalent to a circular pore size of 0.08 μm diameter), 25 μm thickness, 24 seconds gurley, and 1300 kg/cm² tensile strength was used, and it was obtained from Celgard (Charlotte, N.C.). The membrane is known to preferentially permeate $CO_2$ gas and not water at low pressures. (Bhave et al., "Gas Permeation and Separation by Aqueous Membranes Immobilized Across the Whole Thickness of a Thin Section of Hydrophobic Microporous Celgard Films," *J. Membr. Sci*, 27, 41 (1986), the entire contents of which are incorporated herein by reference.) The membranes were never reused throughout the experiments. FIG. 1 is a schematic of the high pressure membrane extractor.

A Monel pressure cylinder 102 held approximately 150 cm³ of water and the membrane filter holder 104 held approximately 45 cm³. The membrane filter holder 104 comprised a 0.25" Swagelok Monel VCO o-ring face seal fitting tube adapter 112, a 0.5" to 0.25" Swagelock reducing union 114, a 0.5" diameter pipe 2.62" long 116, a 1" to 0.5" Swagelock reducing union 118, and a 1" diameter pipe 3" long 120. A stainless steel frit 106 and rubber o-ring 108 were used to support the membranes 110 (Phenomenex, 2.54 cm diameter, 1.5 mm thickness). Stainless steel fittings held the frit 106, a 2.54 cm outer diameter rubber o-ring 108 (inner diameter of 1.5 cm), and membranes 110 in place. As shown in FIG. 1, the 0.01 M bicarbonate solution was pumped into the top of the high pressure cylinder 102 and pressurized using a stainless steel syringe liquid pump from Teledyne ISCO, Inc. (Lincoln, Nebr. 68504). The water/bicarbonate solution was pressurized and maintained at 500 psi in the cylinder 102 and membrane holder 104. The pressurized solution was in constant contact with the membrane 110. A stir bar was used in the Monel cylinder 102 and membrane filter holder 104 to increase mass transfer. In each experiment, the water/bicarbonate solution was in contact with 7 layers of membrane 110 at 500 psi for 5 hours. Several layers of membrane 110 were used to minimize water permeation in the system at 500 psi. Approximately 5 mL of the 150 mL 0.01 M bicarbonate solution permeated over 5 hours. Even though a small amount of solution permeated through the membranes 110, the solution in the cylinder 102 was being replaced by the syringe pump to maintain constant pressure at 500 psi. After each experiment, the water/bicarbonate solution was depressurized and the amount of total $CO_2$ extracted from the solution in the pressure cylinder 102 was measured by a UIC Coulometric system (UIC Inc., Joliet, Ill. 60436) or by strong acid titration. (Millero et al., "Titration Alkalinity of Seawater," *Marine Chem.*, 44, 153 (1993); Edmond, "High Precision Determination of Titration Alkalinity and Total Carbon Dioxide Content of Sea Water by Potentiometric Titration," *Deep-Sea Res.*, 17, 737 (1970), the entire contents of each are incorporated herein by reference.) All solutions for the coulometer were of reagent grade and purchased from UIC Inc. The lower values from the coulometer represent the μmoles/kg of $CO_2$ gas released from the water/bicarbonate solution under pressure (after contact with membrane) compared to the water/bicarbonate solution not subjected to pressure time regimes (inlet sample). A 5 mL sample of each solution was measured by the coulometer. Measurements were made in duplicate to ensure precision within 5%. For the potentiometric titrations, the entire 150 mL of the water/bicarbonate solution sample was collected and titrated with 0.2 M HCl. The titration endpoints for the pressurized solutions in contact with the membranes were compared to the endpoint obtained for the same solution at atmospheric pressure and temperature that was never in contact with the membranes.

Results

Facilitated Transport Membrane (FTM) systems using simple concentrated water/bicarbonate solutions is a viable approach for $CO_2$ separation when the $CO_2$ partial pressures are low and high $CO_2$ selectivity is desired. One such example is the removal of $CO_2$ from breathing atmospheres. In the FTM systems, bicarbonate-carbonate acts as carrier species that reversibly react with $CO_2$ as shown in equations (3) and (5) to increase $CO_2$ gas selectivity and flux. (Glade et al, "Modeling of $CO_2$ release and the carbonate system in multiple-effect distillers," *Desalination*, 222, 605 (2008); Matson et al., "Review Article Number 13: Separation of Gases with Synthetic Membranes," *Chem. Eng. Sci.*, 38, 503 (1983); Ward et al., "Carbon Dioxide-Oxygen Separation: Facilitated Transport of Carbon Dioxide across a Liquid Film," *Science*, 156, 1481 (1967); Kovvali et al., "Carbon Dioxide Separation with Novel Solvents as Liquid Membranes," *Ind. Eng. Chem. Res.*, 41, 2287 (2002); Chen et al., "Immobilized Glycerol-Based Liquid Membranes in Hollow Fibers for Selective $CO_2$—$N_2$ mixtures," *J. Membr. Sci.*, 183, 75 (2001); Yang et al., "Progress in Carbon Dioxide Separation and Capture; A Review," *J. Environ. Sciences*, 20, 14 (2008), the entire contents of each are incorporated herein by reference.) In the present invention, bound $CO_2$ in ionic form (equations 3 and 5) is recovered from saltwater/bicarbonate solutions through gas permeable membranes.

$$CO_2\uparrow + CO_3^{2-} + H_2O \rightleftharpoons 2HCO_3^- \qquad (5)$$

During typical experimental runs using this simple water/bicarbonate system, the gas permeable membranes were clearly reducing the $[CO_2]_T$ by a much greater percentage than the fraction of simple dissolved carbon dioxide as shown by a reduction in $[CO_2]_T$ by coulometry in Table 1. In Table 1, each inlet sample of 0.01 M bicarbonate solution was measured to determine the μmoles/kg of $CO_2$ in the sample before contact with the membrane at 500 psi. The inlet sample was then pumped into the high pressure cylinder and membrane holder where it was in contact with 7 layers of membrane at 500 psi. After contact with the membrane for 5 hours, the sample was depressurized and measured to determine the amount of total $CO_2$ extracted. Table 1 shows a reduction of about 10% under these experimental conditions. This is significant as it would represent an increase of about an order of magnitude in recovery rates as compared to those rates obtained by just recovering the dissolved $CO_2$. Thus the yield for a very large shipboard constrained system could be as high as 1 kg/sec compared to 0.1 kg achievable by only recovering dissolved $CO_2$. During the time of the experiment, the bicarbonate was re-equilibrating to gaseous carbon dioxide, which was being removed from the system by diffusion through the membrane.

TABLE 1

$CO_2$ Reduction Results

| Sample | Conditions | µmoles/kg $CO_2$ | % Reduction by coulometric titration |
|---|---|---|---|
| 0.01 M $NaHCO_3$ in tap water | Inlet sample | 12700 | 11 |
| | After contact with membrane | 11300 | |
| 0.01 M $NaHCO_3$ in deionized water | Inlet sample | 12650 | 8.3 |
| | After contact with membrane | 11600 | |
| 0.01 M $NaHCO_3$/0.5 M NaCl in deionized water | Inlet sample | 12500 | 11 |
| | After contact with membrane | 11100 | |

| Sample | Conditions | Endpoint mL | % Reduction by acid titration |
|---|---|---|---|
| 0.01 M $NaHCO_3$/0.5 M NaCl in tap water | Inlet sample | 11.75 | 0 |
| | After contact with membrane | 11.75 | |

Figure 2:
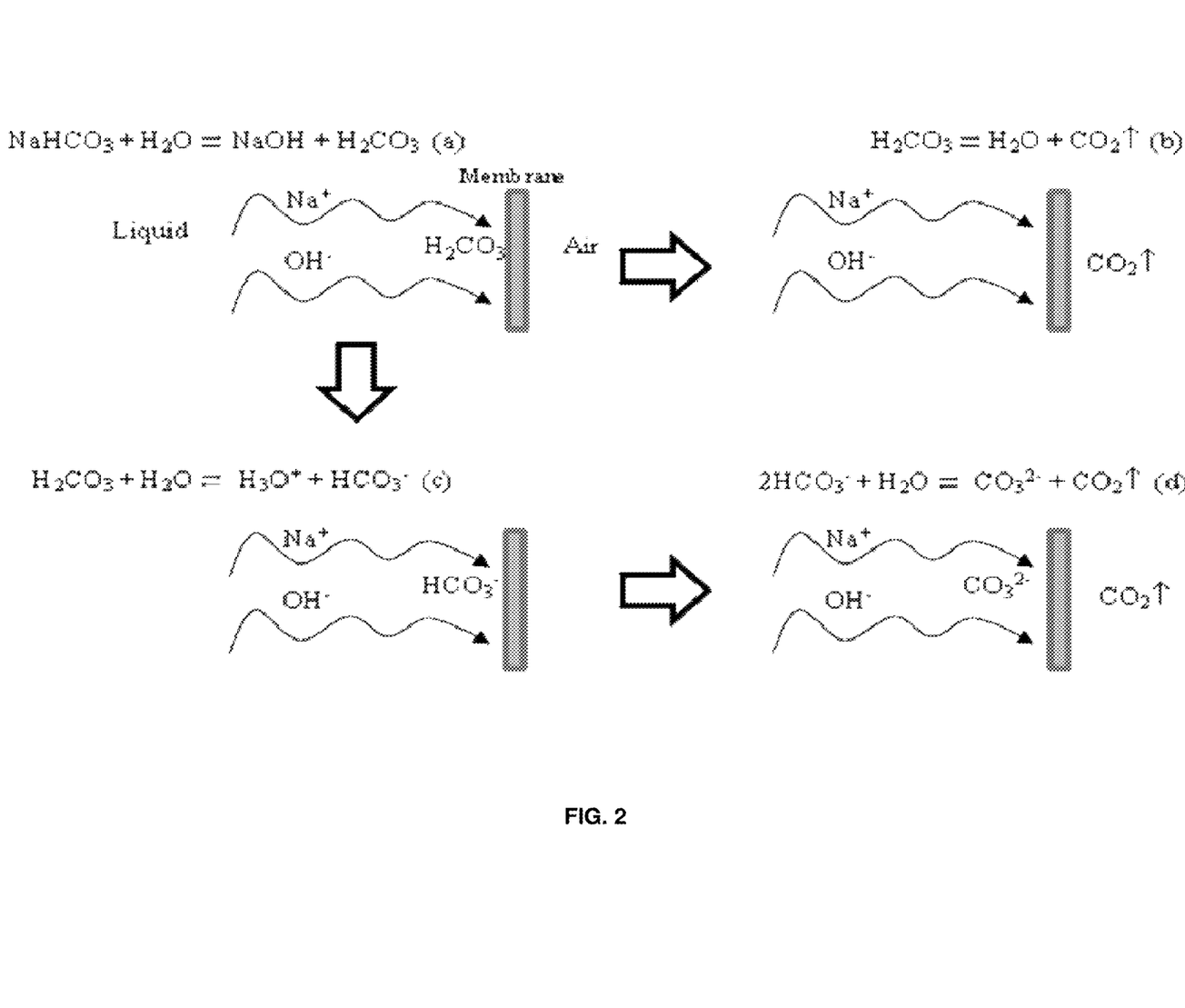

FIG. 2 is a schematic diagram showing the equilibrium equations that describe the gas permeable membrane process for the sodium bicarbonate solution. As the bicarbonate dissolves in water the bicarbonate ion becomes a strong conjugate base ($pK_a$=10.3). This causes the bicarbonate ion to accept a proton from water resulting in the formation of undissociated carbonic acid as shown in equation (a) in FIG. 2. It is the decomposition of this undissociated carbonic acid at the membrane surface that initiates a change to the bulk liquid. As the $CO_2$ ($pK_a$=1.4) passes through the membrane, the bulk liquid experiences an increase in pH (loss of an acidic species) as shown in equation (b) in FIG. 2. To compensate for this, the remaining carbonic acid begins to dissociate, contributing a proton and a bicarbonate ion as shown in equation (c) in FIG. 2. Bicarbonate ions disproportionate ($pK_a$=10.3) according to equation (d) in FIG. 2, this time resulting in the loss of an acidic species through the membrane ($CO_2$) and the formation of the strong base carbonate ion ($pK_a$=3.7). The ratio of carbonate to bicarbonate limits the pH change. Carbonate is the stronger base and so bicarbonate concentrations decrease as illustrated in equations (c) and (d). The process occurring in equations (a) and (b) is essentially physical in nature and initiates a second process that is represented by moving from equation (a) to (c) and finally (c) to (d) which is essentially chemical in nature. In addition to these two aqueous phase buffer anions, the phase transfer of $CO_2$ is also considered. It is reasonable to expect a well designed buffer system that works in equilibrium with all three species to begin to replace removed $CO_2$ as a new equilibrium is approached, equation (d). Time is a consideration because the dissolution and hydration of $CO_2$, equations (a) and (b), is relatively slow compared to concentration changes in the anions, equations (c) and (d). This shift appears to be independent of solution ionic strength as shown in Table 1 where 29.5 grams per liter of sodium chloride is added to the system to take the next step towards simulating a real seawater system.

Data were determined by standard coulometric titrations. Acid titrations using potentiometry were also employed. This is possible since the acid titrates the bicarbonate and carbonate ions which are changed when bicarbonate is removed through re-equilibration to gaseous carbon dioxide and subsequent transfer to the gas phase on the air side of the membrane as illustrated in FIG. 2. In deionized water the bicarbonate species forms a basic solution as shown in equations (6) and (7). Titration with acid only titrates the hydroxide ion which is unchanged by any loss of $CO_2$. Thus when the solution is titrated with HCl, it appears that no change in pH has been produced, even though $[CO_2]_T$ has been decreased by 10%.

$$NaHCO_3 + H_2O \rightleftharpoons NaOH + H_2CO_3 \quad (6)$$

$$H_2CO_3 + H_2O \rightleftharpoons H_3O^+ + HCO_3^- \quad (7)$$

Since the reduction in carbon dioxide was measured, the rate of $CO_2$ permeability across the membrane for this system may be determined by Fick's law shown in equation (8) where F is the $CO_2$ flux, n is the moles of $CO_2$, A is the membrane area and thickness, and t is the time. Table 2 gives the $CO_2$ permeability for this system as $4.0 \times 10^{-7}$ mL/sec $cm^2$ cm Hg. In the context of typical microporous membrane systems, the membrane permeability in gas-liquid systems has been shown to be on the order of $10^2$ to $10^5$ times slower than gas-gas systems (Table 2). This difference has been attributed to liquid infiltration into the membrane pores along with slower gas diffusion in a liquid medium. (Lund et al., "Gas Permeance Measurement of Hollow Fiber Membranes in Gas-Liquid Environment," *AIChE J.*, 48, 635 (2002); Lund et al., "Gas Permeability of Hollow Fiber Membranes in a Gas-Liquid System," *J. Membr. Sci.*, 117, 207 (1996); Eash et al., "Evaluation of Plasma Resistant Hollow Fiber Membranes for Artificial Lungs," *ASAIO J.*, 50, 491 (2004); Yasuda et al., "Transfer of Gas to Dissolved Oxygen in Water Via Porous and Nonporous Polymer Membranes," *J. Appl. Polym. Sci.*, 16, 595 (1972), the entire contents of each are incorporated herein by reference.) However, since $CO_2$ is in the ionic form as carbonate and bicarbonate in the present gas-liquid membrane system, the degree of flux across the membrane will also be dependent on the rate of $CO_2$ disproportionation in the system and the relatively much more rapid ion mobility to the membrane surface. Disproportionation occurs at the surface of the membrane and contributes to increasing $CO_2$ flux across the membranes as the removed $CO_2$ is continually being replenished as carbonic acid, carbonate and bicarbonate re-equilibrate. In typical gas-liquid systems, $CO_2$ gas diffusion is slow. The addition of carrier species described in FTM systems enhances ion diffusion mobility to increase the flux of $CO_2$ across the membrane. Thus, ion mobility will contribute to increasing $CO_2$ flux in this gas-liquid membrane system.

$$F = n/At \quad (8)$$

Table 2 shows the rates of $CO_2$ permeance using different materials in both a gas-gas and a gas-liquid system. Regardless of membrane material and treatment, the range of $CO_2$ permeability in a gas-liquid system is from about 840 to $3200 \times 10^{-7}$ for literature values. These values are about 100 times higher than those of the present invention. This is likely attributed to the fact that the bulk water pressures of our system were significantly higher and additional membrane layers were needed to prevent water permeation. Previous work was done from atmospheric to about 100 psi using a single membrane layer, while the present experiments were performed at 500 psi bulk pressure using 7 membrane layers.

of the very short experiments and very low surface to volume ratios required by the experimental high pressure apparatus.

Reagent grade sodium bicarbonate was added to Key West seawater at a concentration of 1 gram per liter with the total $CO_2$ concentrations approximately 14200 µmoles/kg by strong acid titration with 0.2 M HCl. This concentration is about 5 times higher than the initial seawater concentration.

TABLE 2

Gas Permeability in Membrane Configurations

| Material | System | Rate Gas permeance mL/sec $cm^2$ cm Hg | Reference |
|---|---|---|---|
| Celgard 2400 | gas-liquid | 7 layers $4.0 \times 10^{-7}$ $CO_2$ gas | present invention |
| Celgard X30-240 | gas-gas | $1.5 \times 10^{-2}$ $CO_2$ gas | Bhaumik et al., "Hollow Fiber Membrane Degassing in Ultrapure Water and Microbiocontamination," *J. Membr. Sci.*, 235, 31 (2004) |
| Celgard X30-240 | gas-gas | $1.6 \times 10^{-2}$ $CO_2$ gas | Lund et al., "Gas Permeability of Hollow Fiber Membranes in a Gas-Liquid Environment," *J. Membr. Sci*, 117, 207 (1996) |
| KPF 280E | gas-gas | $1.3 \times 10^{-2}$ $CO_2$ gas | Lund et al., "Gas Permeance Measurement of Hollow Fiber Membranes in Gas-Liquid Environment," *AIChE J.*, 48 635 (2002) |
| KPF 280E | gas-liquid | $3.2 \times 10^{-4}$ $CO_2$ gas | Lund et al., "Gas Permeance Measurement of Hollow Fiber Membranes in Gas-Liquid Environment," *AIChE J.*, 48 635 (2002) |
| Mitsubishi MHF 200L | gas-liquid | $8.4 \times 10^{-5}$ $CO_2$ gas | Lund et al., "Gas Permeance Measurement of Hollow Fiber Membranes in Gas-Liquid Environment," *AIChE J.*, 48 635 (2002) |

The multi-layer gas permeable membrane system of the present invention has two effects on reducing gas permeability. The first is that the multi-layers function as a series of delta pressure gradients from the initial bulk pressure at the top surface of the top membrane (~500 psi) to near atmospheric pressure on the effluent side of the bottom membrane. The second effect of the multiple membrane system is to decrease the water permeability which effectively decreased the effective porosity of the entire stack of membranes by providing a more torturous path for the liquid. Thus, the present invention demonstrates the usefulness of recovering $CO_2$ in the ionic form from salt solutions at pressures near or above the bubble point of single membrane layers (~500 psi).

Though higher pressure causes permeance of water into the membrane which effectively lowers the rate of gas permeability, the effect bulk liquid pressure has on the phase transition of $CO_2$ in the ionic form of bicarbonate as it disproportionates to $CO_2$ and carbonate in a closed system was found to be significant. Preliminary results for this multi-layer member system suggest that pressures below 100 psi yield no extraction of bound $CO_2$ in the ionic form from the aqueous bicarbonate system. This is likely because the equilibrium of the buffer anions is an opposing force that limits the amount of $CO_2$ released.

Experimental—Seawater

The carbon content of the seawater was increased by the addition of sodium bicarbonate to concentrations about five times those seen in typical seawater. This was done to enhance the measurable loss in bound $CO_2$ in the ionic form of bicarbonate and carbonate and to overcome the limitations The reason for using higher salt concentrations is to compensate for the small experimental sample sizes used in the pressure experiments. The pH of the saltwater/bicarbonate solution measured 8.0, and all pH measurements were conducted with a standardized Fisher combination glass electrode. A microporous polypropylene membrane commercially designated as 2400 Microporous Membrane with a 37% porosity, 0.117×0.042 µm rectangular pore dimensions (with effective pore area of 0.005 $µm^2$ which is equivalent to a circular pore size of 0.08 µm diameter), 25 µm thickness, 24 seconds gurley, and 1300 kg/$cm^2$ tensile strength was used, and it was obtained from Celgard (Charlotte, N.C.). The membranes were never reused throughout the experiments. FIG. 1 is a schematic of the high pressure membrane extractor.

A Monel pressure cylinder 102 held approximately 150 $cm^3$ of sample volume and the membrane filter holder 104 held approximately 45 $cm^3$. A stainless steel frit 106 and rubber o-ring 108 were used to support the membranes 110 (Phenomenex, 2.54 cm diameter, 1.5 mm thickness). Stainless steel fittings held the frit 106, a 2.54 cm outer diameter rubber o-ring 108 (inner diameter of 1.5 cm), and membranes 110 in place. As shown in FIG. 1, the seawater/bicarbonate solution was pumped into the top of the high pressure cylinder 102 and pressurized using the stainless steel syringe liquid pump from Teledyne ISCO, Inc. (Lincoln, Nebr. 68504). The seawater/bicarbonate solution was pressurized and maintained at a given pressure (100, 250, 500, and 1000 psi) in the cylinder 102 and membrane holder 104. The pressurized solution was in constant contact with the membrane 110. A stir bar was used in the Monel cylinder 102 and membrane filter holder 104 to increase mass transfer. In each experiment, the seawater/bicarbonate solution was in contact with 7 layers of membrane 110 at a given pressure (100, 250, 500 and 1000 psi) for 5 hours. Seven layers of membrane 110 were used to minimize water permeation in the system. At the higher pressures (500 psi and 1000 psi) approximately 5 mL of the 150 mL seawater/bicarbonate solution permeated over 5 hours. Even though a small amount of solution permeated through the membranes 110, the solution in the cylinder 102 was being replaced by the syringe pump to maintain constant pressure. After each experiment, the seawater/bicarbonate solution was depressurized and the entire 150 mL of the seawater/bicarbonate solution sample was collected and titrated with 0.2 M HCl. (Millero et al., "Titration Alkalinity of Seawater," *Marine Chem.*, 44, 153 (1993); Edmond, "High Precision Determination of Titration Alkalinity and Total Carbon Dioxide Content of Sea Water by Potentiometric Titration," *Deep-Sea Res.*, 17, 737 (1970).) The titration endpoints for the pressurized solutions in contact with the membranes were compared to the endpoint obtained for the same solution at atmospheric pressure and temperature that was never in contact with the membranes. The lower values from the titrations represent the μmoles/kg of $CO_2$ gas released from the seawater/bicarbonate solution under pressure (after contact with membrane) compared to the seawater/bicarbonate solution not subjected to pressure time regimes (inlet sample).

Results

As shown in Table 3, an initial seawater/sodium bicarbonate solution was measured to determine the μmoles/kg of $CO_2$ in the sample by acid titration using potentiometry before contact with the membrane layers at different pressures. A sample containing approximately 14,200 μmoles/kg of $CO_2$ was then pumped into the high pressure cylinder 102 and the membrane holder 104 where it was in contact with 7 layers of membrane 110 at a given pressure (100, 250, 500, 1000 psi) for 5 hours. After contact with the membrane for 5 hours, the sample was depressurized and measured to determine the amount of total $CO_2$ extracted.

TABLE 3

$CO_2$ Reduction Results

| Sample | Pressure (psi) | Conditions | μmols/kg $CO_2$ | Q-Test | % Reduction |
|---|---|---|---|---|---|
| 1 gram/L NaHCO3 in Key West seawater | 0 | Inlet sample | 14200 | | |
| 1 gram/L NaHCO3 in Key West seawater | 100 | Outlet sample | 14200 | | 0 |
| 1 gram/L NaHCO3 in Key West seawater | 100 | Outlet sample | 14200 | | 0 |
| 1 gram/L NaHCO3 in Key West seawater | 250 | Outlet sample | 11786 | 0.23 | 17 |
| 1 gram/L NaHCO3 in Key West seawater | 250 | Outlet sample | 12212 | | 14 |
| 1 gram/L NaHCO3 in Key West seawater | 500 | Outlet sample | 13206 | | 7 |
| 1 gram/L NaHCO3 in Key West seawater | 500 | Outlet sample | 13561 | | 4.5 |
| 1 gram/L NaHCO3 in Key West seawater | 500 | Outlet sample | 12638 | | 11 |
| 1 gram/L NaHCO3 in Key West seawater | 1000 | Outlet sample | 13614 | 0.03 | 4 |
| 1 gram/L NaHCO3 in Key West seawater | 1000 | Outlet sample | 12354 | | 13 |
| 1 gram/L NaHCO3 in Key West seawater | 1000 | Outlet sample | 12638 | | 11 |
| Mean | | | 12751 | | 10 |
| Standard deviation | | | 12751 ± 656 | | 10 ± 4.6 |
| Standard error | | | 12751 ± 232 | | 10 ± 1.6 |

During the initial experimental runs the $[CO_2]_T$ at pressures of 100 psi was not reduced after 5 hours. As shown in Table 3, as the pressure was increased from 100 psi to 250 psi, a significant reduction in $[CO_2]_T$ was observed, and this is a much greater percentage than the fraction of simple dissolved carbon dioxide in the system. Table 3 shows an average reduction of about 15% under these experimental conditions. This is significant as it would represent an increase of about an order of magnitude in recovery rates as compared to those rates obtained by just recovering the dissolved $CO_2$. Thus the yield for a very large shipboard constrained system could be as high as 1 kg/sec compared to 0.1 kg/sec achievable by only recovering dissolved $CO_2$. When the pressure is raised to pressures corresponding to that of the bubble point pressure of a single membrane layer (500 psi), there is still a measurable loss in $[CO_2]_T$; however, this reduction appears to be less and difficult to repeat. Similar findings are shown for the results obtained at 1000 psi.

Pressures above 100 psi appear to shift the equilibrium conditions shown in equation (3) in favor of bicarbonate re-equilibrating to gaseous carbon dioxide; however, any increase in the $CO_2$ flux or amount of $CO_2$ recovered by this process has been effected by the bubble point of a single membrane layer. Below 500 psi $CO_2$ gas passes through the membrane pores while the liquid is prohibited from passing. At or above this pressure, the liquid fills the pores and permeates completely, preventing the gas permeability effect from operating. The multiple layers are used to prevent water permeability at higher pressures but they actually decrease the rate of $CO_2$ gas permeability that would be expected by the use of single layer. Thus the results suggest that under these experimental conditions, no measurable pressure effect is observed above 100 psi.

To further substantiate these findings, a Q-test was performed using the eight measured results for $CO_2$ loss at pressures of 250, 500, and 1000 psi. The Q-test is the preferred method for data rejection when less than ten measurements are involved. The standard Q for eight values if Q=0.47. (Bauer, *A Statistical Manual for Chemists*, Academic Press, NY (1971), the entire contents of which are incorporated herein by reference.) Table 3 shows that the Q-values (0.23 and 0.03) obtained for the highest and lowest $CO_2$ values (11786 and 13614) measured in the test series is less than the standard Q-value for eight measurements. Thus all eight measurements are valid and none of the measurements can be rejected from the data set assuming no negligible effects of pressure above 100 psi. Therefore, all eight values were averaged to determine a standard deviation and standard error as shown at the bottom of Table 3. While the standard deviation is an expression of the precision of the results obtained from the method, the standard error is an expression of limits that represent the true value with a confidence of 68%. The mean, standard deviation, and standard error were also determined and reported for the percent reduction of $CO_2$. Table 3 shows an average 10% loss in $CO_2$, which corresponds well to previous results obtained for simple water/bicarbonate systems pressurized to 500 psi.

Figure 3:
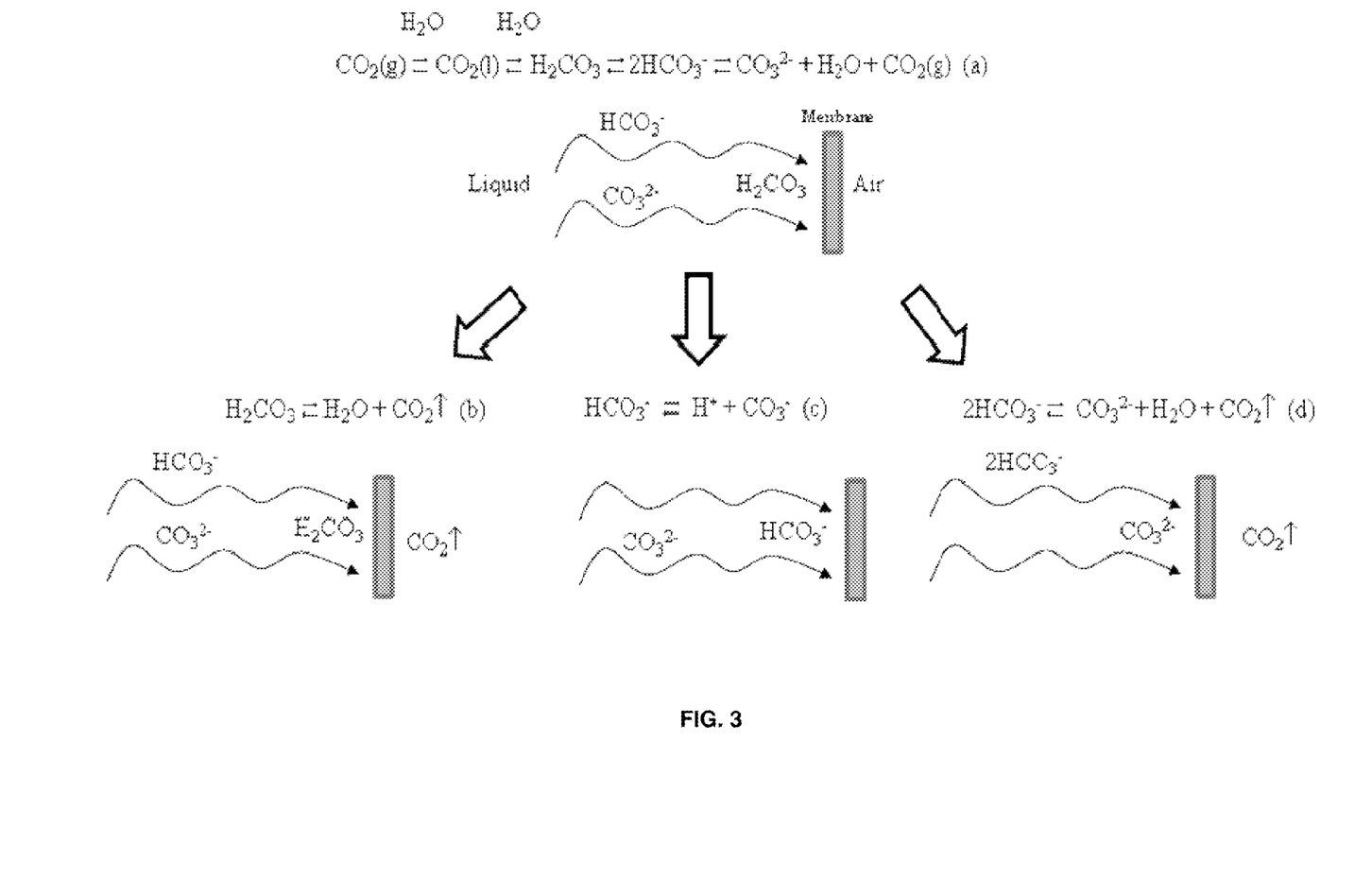

FIG. 3 is a schematic diagram showing the equilibrium equations that describe the gas permeable membrane process for a seawater solution. In seawater, $[CO_2(g)]$ is hydrated by water to form undissociated carbonic acid as shown in equation (a) in FIG. 3, and this carbonic acid species is in equilibrium with the dissolved bicarbonate and carbonate species. The decomposition of undissociated carbonic acid at the membrane surface as shown in equation (b) accounts for up to 2 to 3% of $[CO_2]_T$ in seawater. As the $CO_2$ ($pk_a$=1.4) passes through the membrane, the bulk liquid experiences an increase in pH (loss of an acidic species) as shown in equation (b) of FIG. 3. Seawater is buffered by bicarbonate and carbonate and, to compensate for this initial pH increase, the bicarbonate begins to dissociate contributing a proton and a carbonate ion as shown in equation (c) in FIG. 3. In addition to this, bicarbonate ions that were once in equilibrium as shown in equation (a) also begin to disproportionate ($pK_a$=10.3) according to equation (d) of FIG. 3, this time resulting in the loss of an acidic species through the membrane ($CO_2$) and the formation of the additional strong base carbonate ions ($pK_a$=3.7). The ratio of carbonate to bicarbonate limits the pH change. Carbonate is the stronger base and so bicarbonate concentrations decrease as illustrated in equations (c) and (d). The process occurring in equations (a) and (b) is essentially physical in nature and initiates a second process that is represented by moving from equation (a) to (c) and finally (a) to (d) which is essentially chemical in nature. In addition to these two aqueous phase buffer anions, the phase transfer of $CO_2$ is also considered. It is reasonable to expect a well designed buffer system that works in equilibrium with all three species to begin to replace removed $CO_2$ as a new equilibrium is approached, equation (d). Time is a consideration because the dissolution and hydration of $CO_2$, equations (a) and (b), is relatively slow compared to concentration changes in the anions, equations (c) and (d). This shift appears to be independent of solution ionic strength. The final solution pH after the experiment is lower (more acidic) because the bulk of the $CO_2$ comes from the loss of the basic bicarbonate/carbonate system.

Table 2 shows the rates of $CO_2$ permeance using different materials in both a gas-gas and gas-liquid system. Regardless of membrane material and treatment, the range of $CO_2$ permeabilities in a gas-liquid system is from about 840 to 3200× $10^{-7}$ for literature values. Thus values from the present experiments are about 100 times slower. This is attributed to the fact that the bulk water pressures of the present invention must be above 100 psi, and at these higher pressures, additional membrane layers are needed to minimize water permeation. Similarly, Lund et al. put into perspective the difficulty of eliminating water permeability in microporous fiber gas-liquid environments that led to lower than expected $CO_2$ permeance rates. (Lund. et al., "Gas Permeance Measurement of Hollow Fiber Membranes in Gas-Liquid Environment," *AIChE J.*, 48,635 (2002).)

The multi-layer gas permeable membrane of the present invention has two effects on reducing gas permeability. The first is that the multi-layers function as a series of delta pressure gradients from the initial bulk pressure at the top surface of the top membrane (~500 psi) to near atmospheric pressure on the effluent side of the bottom membrane. The second effect of the multiple membrane system is to decrease the water permeability which effectively decreased the effective porosity of the entire stack of membranes by providing a more torturous path for the liquid.

Though higher pressure causes permeance of water into the membrane which effectively lowers the rate of gas permeability, the effect bulk liquid pressure has on the phase transition of $CO_2$ in the ionic form of bicarbonate as it disproportionates to $CO_2$ and carbonate in a closed system was found to be significant. The results verify that at pressures below 100 psi bound $CO_2$ in the ionic form cannot be extracted from both aqueous bicarbonate and seawater/bicarbonate systems due the opposing forces caused by the equilibrium of the buffer anions. At pressures near or above the bubble point pressure of a single membrane layer, any increase in the phase transition of $CO_2$ in the ionic form of bicarbonate is reduced by the permeance of the water into the membrane pores.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A system to recover $CO_2$ from seawater and/or aqueous bicarbonate systems, comprising:
   a gas permeable membrane comprising multiple layers; and
   a solution comprising seawater, aqueous bicarbonate, or both, wherein the solution is under a pressure greater than 100 psig;

wherein the solution comprises bound $CO_2$ in the ionic form of bicarbonate and carbonate and wherein these ions dissociate and release $CO_2$; and wherein gaseous $CO_2$ and dissociated $CO_2$ diffuse from the solution through the membrane.

2. The system of claim 1, wherein at least one layer of the gas permeable membrane is a microporous polypropylene membrane.

3. The system of claim 1, wherein the gas permeable membrane has seven layers.

4. The system of claim 1, wherein the pressure is near the bubble point pressure of a single layer of a gas permeable membrane.

5. The system of claim 1, wherein the pressure is between 100 and 1000 psig.

6. The system of claim 1, wherein the pressure is about 500 psig.

7. A method for recovering $CO_2$ from seawater and/or aqueous bicarbonate systems, comprising the steps of:

pressurizing a solution comprising seawater, aqueous bicarbonate, or both to greater than 100 psig;

contacting the pressurized solution with a gas permeable membrane comprising multiple layers; and dissociating bound $CO_2$ from bicarbonate and carbonate ions in the solution and releasing $CO_2$;

wherein gaseous $CO_2$ and dissociated $CO_2$ diffuse from the pressurized solution through the membrane.

8. The method of claim 7, wherein at least one layer of the gas permeable membrane is a microporous polypropylene membrane.

9. The method of claim 7, wherein the gas permeable membrane has seven layers.

10. The method of claim 7, wherein the pressure is near the bubble point pressure of a single layer of a gas permeable membrane.

11. The method of claim 7, wherein the pressure is between 100 and 1000 psig.

12. The method of claim 7, wherein the pressure is about 500 psig.

* * * * *